(12) United States Patent
Chen et al.

(10) Patent No.: US 7,956,779 B2
(45) Date of Patent: Jun. 7, 2011

(54) NON-LINEAR INTERPOLATION CIRCUIT, INTERPOLATION CURRENT GENERATING CIRCUIT THEREOF AND METHOD FOR CONVERTING DIGITAL DATA INTO ANALOG DATA

(75) Inventors: Yi-Jan Emery Chen, Taipei (TW); Pang-Jung Liu, Taipei (TW)

(73) Assignee: National Taiwan University, Taipei (TW)

( * ) Notice: Subject to any disclaimer, the term of this patent is extended or adjusted under 35 U.S.C. 154(b) by 43 days.

(21) Appl. No.: 12/512,988

(22) Filed: Jul. 30, 2009

(65) Prior Publication Data
US 2010/0301904 A1 Dec. 2, 2010

(30) Foreign Application Priority Data

May 26, 2009 (TW) .............................. 98117511 A

(51) Int. Cl.
*H03M 1/00* (2006.01)
(52) U.S. Cl. ....................................... 341/138; 345/690
(58) Field of Classification Search .................. 341/138, 341/139, 144, 145; 345/87–90, 99, 103, 345/104, 92–96, 690, 204, 211; 348/204; 399/66

See application file for complete search history.

(56) References Cited

U.S. PATENT DOCUMENTS

| 7,573,922 B2 * | 8/2009 | Kamatani et al. .......... 372/38.01 |
| 2002/0067326 A1 * | 6/2002 | Aoki .............................. 345/89 |

* cited by examiner

*Primary Examiner* — Joseph Lauture
(74) *Attorney, Agent, or Firm* — CKC & Partners Co., Ltd.

(57) ABSTRACT

A non-linear interpolation circuit includes current interpolation units and an I-V converter. The current interpolation units receive an operating voltage corresponding to digital image data and corresponding reference voltages to generate corresponding operating currents. When the operating voltage changes, at least one of the corresponding current interpolation units generate the corresponding operating current, and the operating currents with respect to the operating voltage are superimposed to form an interpolation current. The I-V converter converts the interpolation current into an interpolation voltage. An interpolation current generating circuit and a method for converting digital data into analog data are also disclosed herein.

20 Claims, 7 Drawing Sheets

NON-LINEAR INTERPOLATION CIRCUIT, INTERPOLATION CURRENT GENERATING CIRCUIT THEREOF AND METHOD FOR CONVERTING DIGITAL DATA INTO ANALOG DATA

RELATED APPLICATIONS

This application claims priority to Taiwan Patent Application Serial Number 98117511, filed May 26, 2009, which is herein incorporated by reference.

BACKGROUND

1. Field of Invention

The present invention relates to an interpolation digital-to-analog converter. More particularly, the present invention relates to an interpolation digital-to-analog converter for use in a source driver of a liquid crystal display.

2. Description of Related Art

For a conventional liquid crystal display, voltages applied to both sides of a liquid crystal layer fail to have a linear relation to light transmittance of the liquid crystal layer, thus when digital image data are converted into the voltages applied to both sides of the liquid crystal layer, a source driver needs to generate gamma voltages for gamma corrections of the applied voltages, so as to reduce color distortion shown on the liquid crystal display.

FIG. 1 illustrates a block diagram of a source driver in a conventional liquid crystal display. In the source driver 100, the shift register 110 enables the data register 120 sequentially from the left or right side, and the data register 120 is sequentially loaded with digital image data R, G, B according to the shift register 110 and its received clock signal CLK and then the digital image data are transmitted to the data latch 130. Next, the level shifter 140 adjusts levels of the outputs of the data latch 130, and the outputs of the data latch 130 are then converted into analog voltages by the digital-to-analog converter (DAC) 150. The analog voltages from the DAC 150 are transmitted through the buffer 160 to the liquid crystal display (LCD) panel, so as to drive the pixel array in the LCD panel.

FIG. 2 illustrates a gamma curve for gamma correction in a conventional liquid crystal display. As shown in FIG. 2, the horizontal coordinate represents digital image gray levels of a single sub-pixel, and the vertical coordinate represents gamma voltages corresponding to the digital image gray levels. For each sub-pixel, the light transmittance of the liquid crystal can be adjusted by changing the input voltages applied to both sides of the liquid crystal layer, such that the sub-pixel shows different illuminations. Furthermore, in order to prevent the liquid crystal molecules from deteriorating, gamma voltages with positive-polarity and negative-polarity can be alternately applied too both sides of the liquid crystal layer so as to protect the liquid crystal molecules.

However, in the foregoing conventional DAC 150, the required gamma voltages are usually obtained by employing resistor strings for generating dividing voltages, and this manner usually requires large areas to be designed and thus cannot effectively reduce the size of the circuit.

SUMMARY

In accordance with one embodiment of the present invention, an interpolation current generating circuit is provided. The interpolation current generating circuit includes a first current interpolating unit and a second current interpolating unit. The first current interpolating unit is configured for receiving a first reference voltage and an operating voltage corresponding to digital image data to generate a first operating current. The second current interpolating unit is coupled in parallel to the first current interpolating unit and configured for receiving the operating voltage and a second reference voltage to generate a second operating current, and the second reference voltage is larger than the first reference voltage. When the operating voltage starts to increase, the first current interpolating unit generates the first operating current corresponding to the operating voltage to be an interpolation current, and when the operating voltage is larger than the first reference voltage and continues increasing to a preset value, the second current interpolating unit generates the second operating current corresponding to the operating voltage and the second operating current is superimposed on the first operating current to be the interpolation current.

In accordance with another embodiment of the present invention, a non-linear interpolation circuit is provided. The non-linear interpolation circuit includes a plurality of current interpolating units and a current-to-voltage converting unit. The current interpolating units are configured for receiving an operating voltage corresponding to digital image data and a plurality of corresponding reference voltages to generate a plurality of corresponding operating currents wherein at least one of the current interpolating units generates at least one corresponding operating current of the operating currents when the operating voltage changes, and the operating currents generated based on the operating voltage are superimposed to be an interpolation current. The current-to-voltage converting unit is configured for converting the interpolation current into an interpolation voltage.

In accordance with yet another embodiment of the present invention, a method for converting digital data into analog data is provided. The method includes the steps of: receiving an operating voltage corresponding to digital image data; comparing the operating voltage with a plurality of reference voltages respectively; generating one or more operating currents corresponding to the comparisons of the operating voltage and the reference voltages; superimposing the operating currents to be an interpolation current; and converting the interpolation current into an interpolation voltage.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE PREFERRED EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 1:
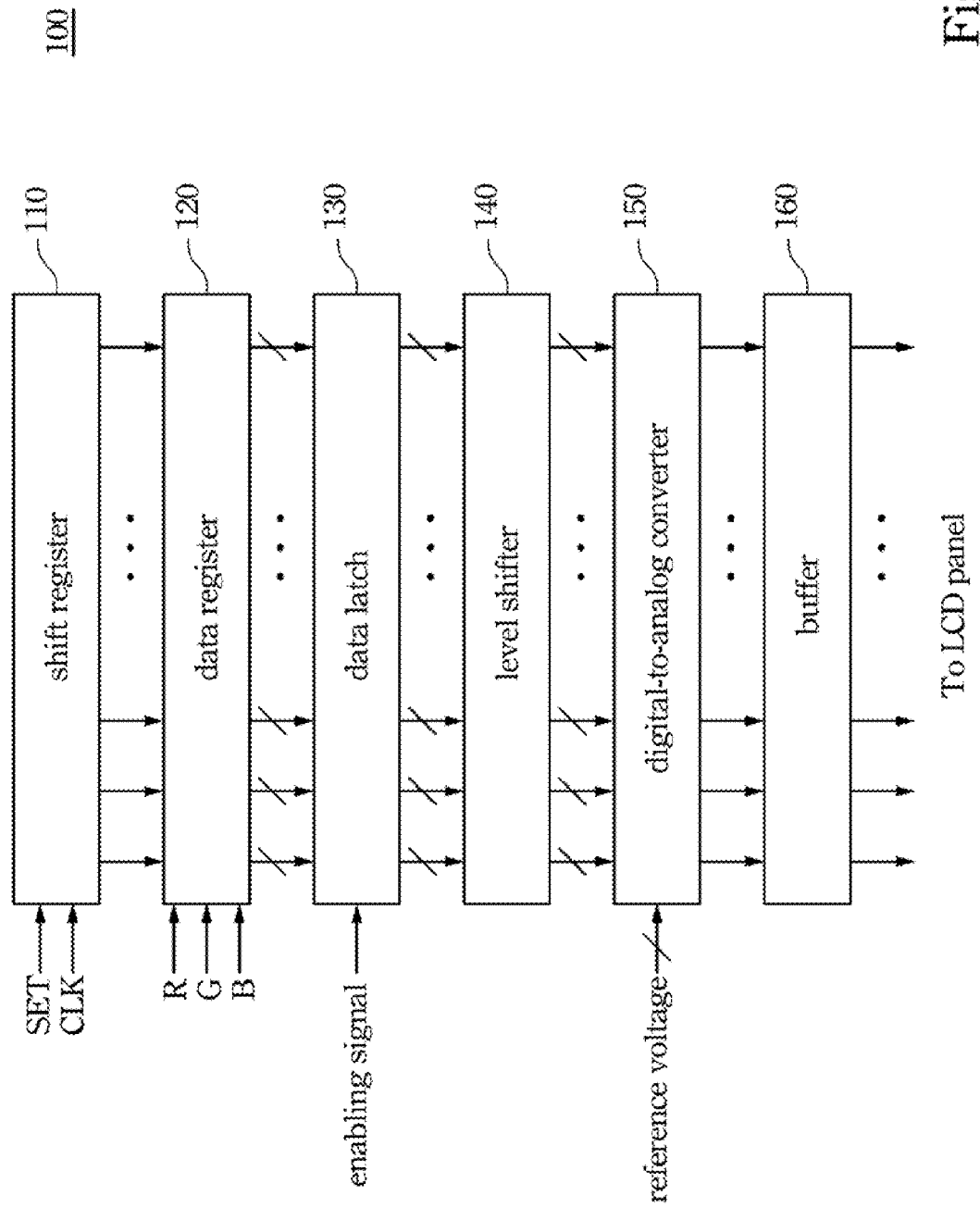
FIG. 1 illustrates a block diagram of a source driver in a conventional liquid crystal display.
Figure 2:
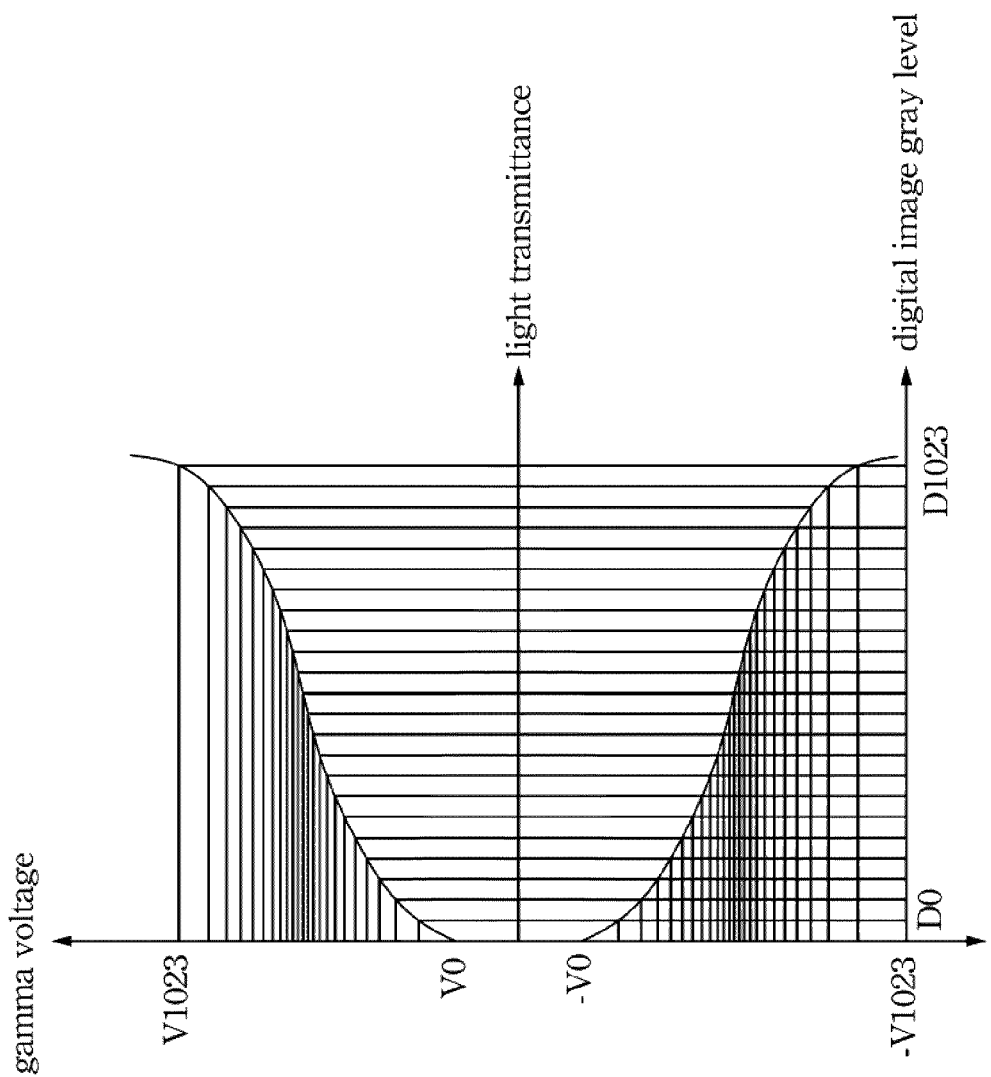
FIG. 2 illustrates a gamma curve for gamma correction in a conventional liquid crystal display.
Figure 3:
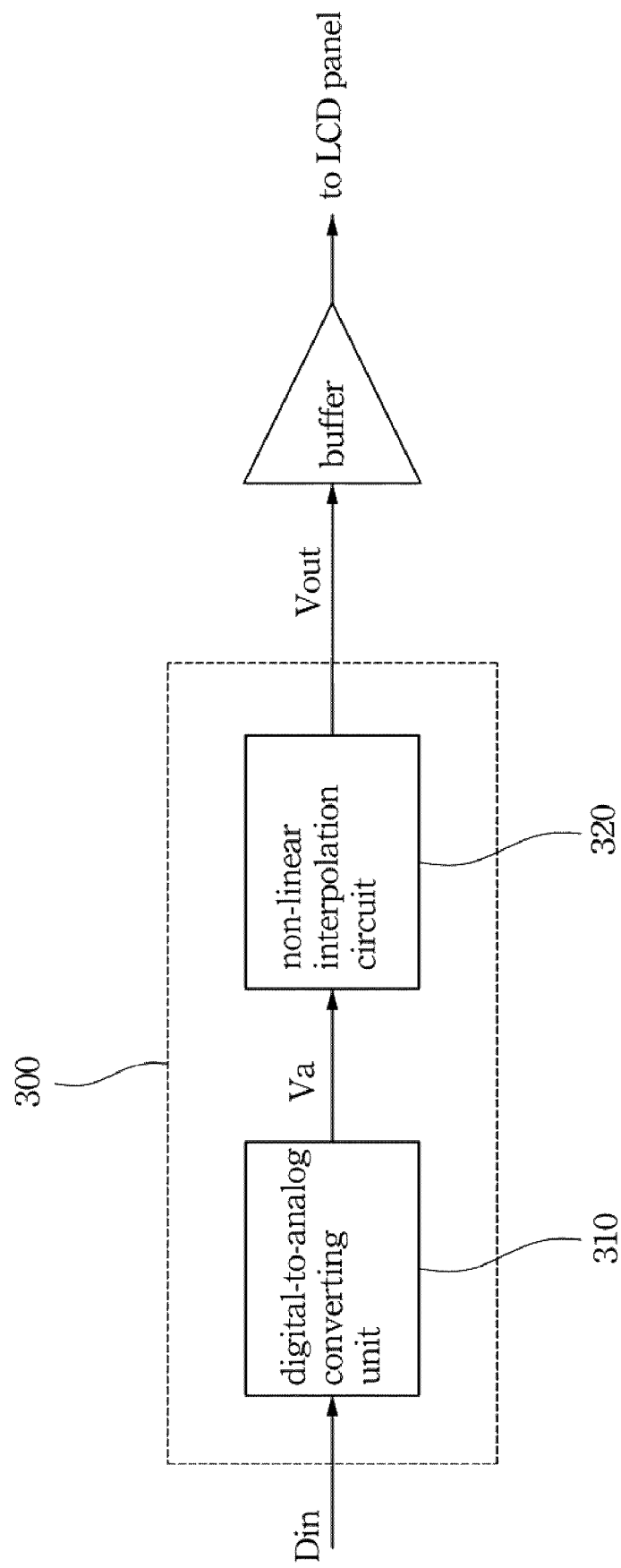
FIG. 3 illustrates an interpolation digital-to-analog converter (DAC) according to one embodiment of the present invention.

FIG. 3 illustrates an interpolation digital-to-analog converter (DAC) according to one embodiment of the present invention. The interpolation DAC 300 is configured for converting digital image data Din (e.g. digital image gray level) into a voltage signal Vout as a gamma voltage for gamma correction. The interpolation DAC 300 includes a digital-to-analog converting unit 310 and a non-linear interpolation circuit 320, in which the digital-to-analog converting unit 310 is configured for converting the digital image data Din into an operating voltage Va, and the non-linear interpolation circuit 320 is configured for converting the operating voltage Va into an interpolation voltage outputted to be the gamma correction voltage Vout.

The digital-to-analog converting unit 310 can be a cyclic digital-to-analog converting unit for periodically receiving one by one a number of bits represented by the digital image data Din and converting the digital image data Din into the corresponding operating voltage Va. For example, the digital-to-analog converting unit 310 starts to process the bits one by one from a least significant bit (LSB) of the digital image data Din, and then converts them into the operating voltage Va. Furthermore, the digital-to-analog converting unit 310 also can be a parallel digital-to-analog converting unit for simultaneously processing a number of bits represented by the digital image data Din and converting the digital image data Din into the corresponding operating voltage Va.

The non-linear interpolation circuit 320 correspondingly and piecewise generates the interpolation voltages to be the gamma correction voltage Vout according to the operating voltage Va from the digital-to-analog converting unit 310, such that the gamma correction voltage Vout corresponds to the digital image data Din and is shown in the gamma curve in a segmented and linear manner.

Figure 4:
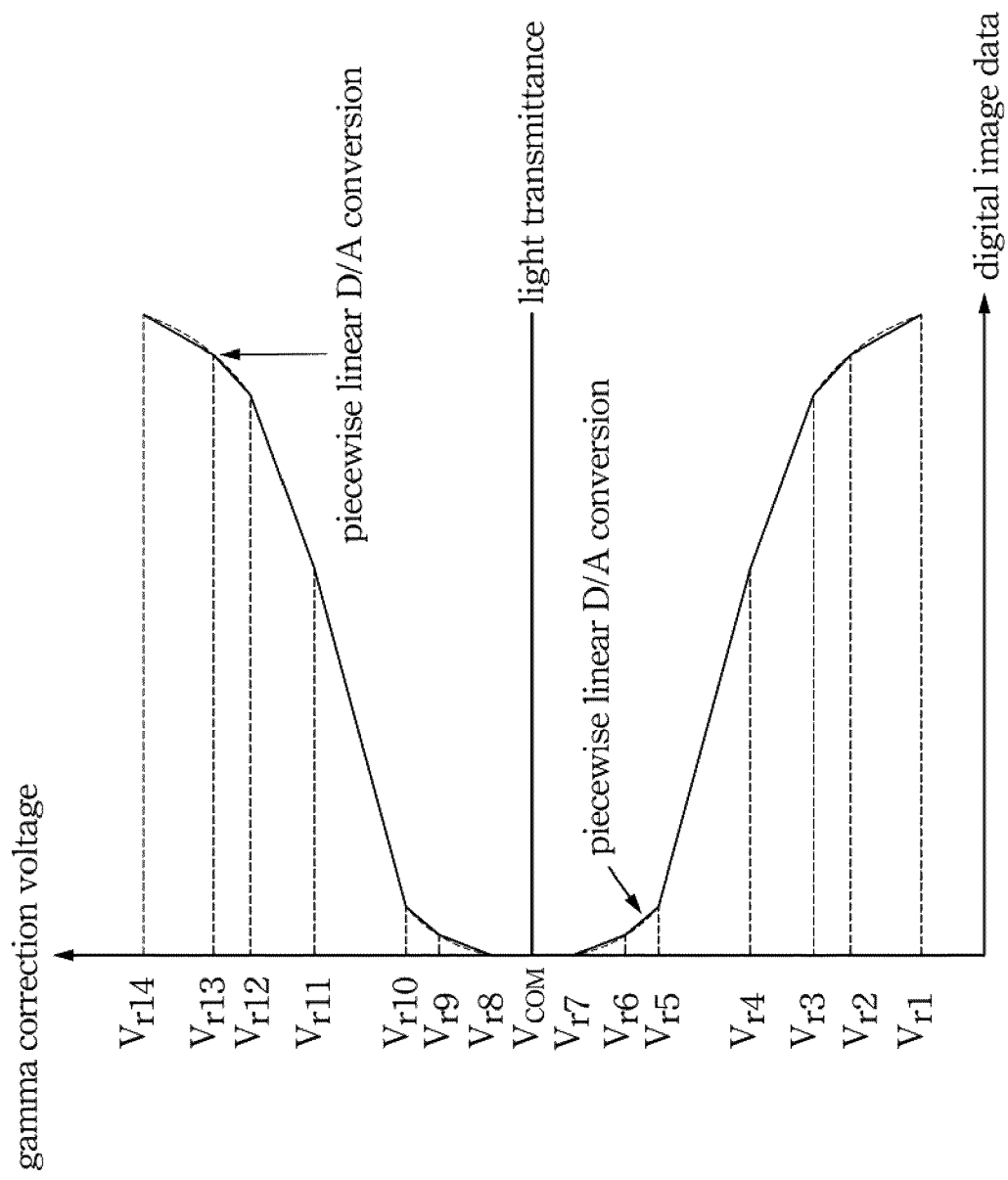
FIG. 4 illustrates a gamma curve for gamma correction according to one embodiment of the present invention.

FIG. 4 illustrates a gamma curve for gamma correction according to one embodiment of the present invention. Specifically, the interpolation DAC 300 performs segmented and linear digital-to-analog conversion for the digital image data, such that the gamma curve is separated into several segments (in the present embodiment both upper half and lower half respectively have 6 segments) and performs non-linear changes, and the aforementioned segments similarly match the conventional linear gamma curve; the gamma correction voltages in each segment, however, perform linear changes according to different digital image data. In addition, the gamma correction voltages further can be positive-polarity gamma correction voltages (e.g. Vr8, Vr9, Vr10, . . . , etc.) relative to a common voltage Vcom, or negative-polarity gamma correction voltages (e.g. Vr7, Vr6, Vr5, . . . , etc.) relative to the common voltage Vcom.

Figure 5:
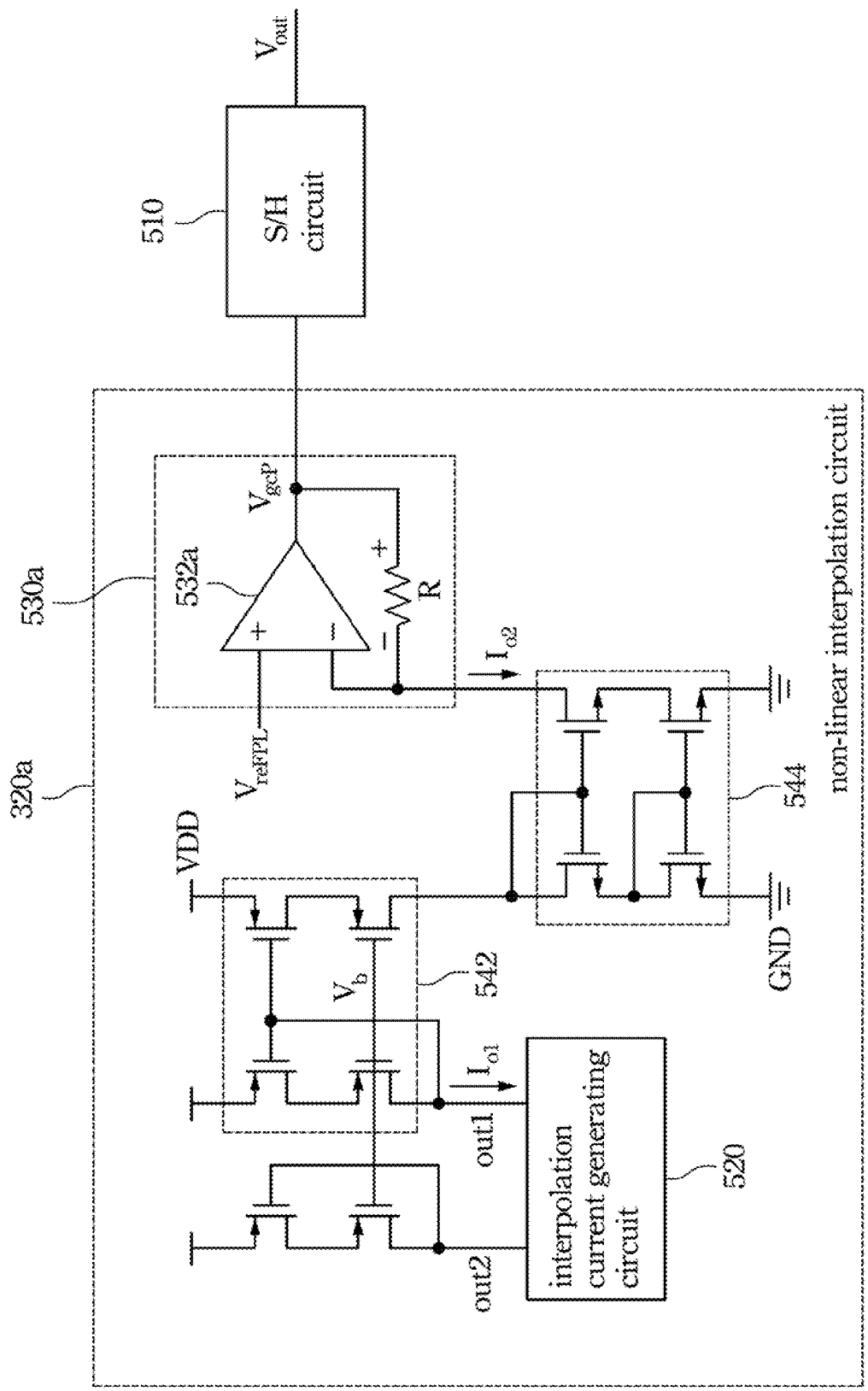
FIG. 5 illustrates the non-linear interpolation circuit as shown in FIG. 3 according to one embodiment of the present invention.

Referring to FIG. 3 again, when the digital-to-analog converting unit 310 is a cyclic digital-to-analog converting unit, due to the digital-to-analog converting unit 310 periodically receiving one by one a number of bits and converting the bits into the corresponding operating voltage Va for the non-linear interpolation circuit 320, the interpolation DAC 300 can further include a sample-and-hold (S/H) circuit 510 (as shown in FIG. 5) for collecting the interpolation voltages from the non-linear interpolation circuit 320 after the digital-to-analog converting unit 310 completely converts the bits of the digital image data Din into the operating voltage Va and the operating voltage Va is processed by the non-linear interpolation circuit 320, to correspondingly output the gamma correction voltage Vout. At the moment, the non-linear interpolation circuit 320 can be temporarily deactivated and re-activated until the digital-to-analog converting unit 310 completely converts the bits of the next digital image data Din. As a result, the power dissipation of the non-linear interpolation circuit 320 can be effectively saved. For example, if the digital image data Din are referred to the pixel gray level, the non-linear interpolation circuit 320 probably needs only "1/(pixel gray level)" times the originally necessary power.

FIG. 5 illustrates the non-linear interpolation circuit as shown in FIG. 3 according to one embodiment of the present invention. The non-linear interpolation circuit 320a includes an interpolation current generating circuit 520 and a current-to-voltage (I-V) converting unit 530a, in which the interpolation current generating circuit 520 is configured for generating an interpolation current $I_{O1}$ corresponding to the digital image data Din, and the current-to-voltage converting unit 530a is configured for converting the interpolation current $I_{O1}$ into the interpolation voltage $V_{gcP}$. In one embodiment, the interpolation DAC 300 includes no S/H circuit 510, and the interpolation voltage $V_{gcP}$ is directly outputted to be the gamma correction voltage Vout. In addition, in present embodiment, the non-linear interpolation circuit 320a further can include current mirror units 542 and 544 and the interpolation current $I_{O1}$ from the interpolation current generating circuit 520 further becomes the current $I_{O2}$ outputted from the current-to-voltage converting unit 530a after mirrored by the current mirror units 542 and 544, such that the current-to-voltage converting unit 530a generates the interpolation voltage $V_{gcP}$ according to the current $I_{O2}$.

The current-to-voltage converting unit 530a includes a voltage-drop unit (e.g. resistor R) and an operational amplifier 532a. The operational amplifier 532a has a positive input for receiving a positive-polarity reference voltage $V_{refPL}$ which can be preset to be the voltage Vr8 as shown in FIG. 4. The resistor R is coupled between a negative input and an output of the operational amplifier 532a. When the current $I_{O2}$ is generated, the interpolation voltage $V_{gcP}$ is correspondingly generated at the output of the operational amplifier 532a according to the current $I_{O2}$ flowing through the resistor R and equivalent to the interpolation current $I_{O1}$ (i.e. $V_{gcP}=V_{refPL}+I_{O2}*R$), in which the interpolation voltage $V_{gcP}$ is the positive-polarity interpolation voltage relative to the common voltage Vcom and also can be directly used as the positive-polarity gamma correction voltage relative to the common voltage Vcom without the S/H circuit 510.

Figure 6:
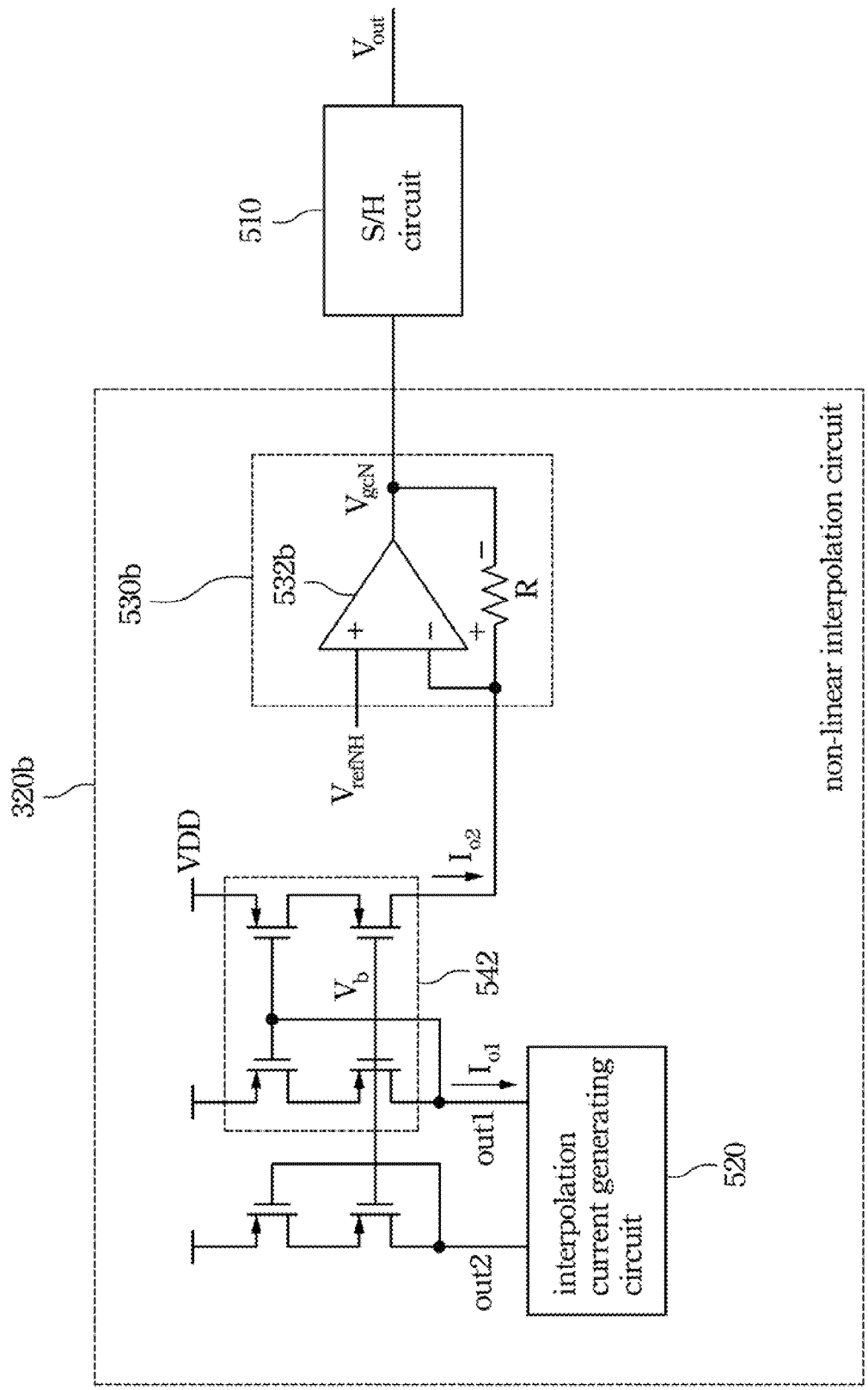
FIG. 6 illustrates the non-linear interpolation circuit as shown in FIG. 3 according to another embodiment of the present invention.

FIG. 6 illustrates the non-linear interpolation circuit as shown in FIG. 3 according to another embodiment of the present invention. Compared to FIG. 5, the non-linear interpolation circuit 320b in the present embodiment includes the current mirror unit 542 but not the current mirror unit 544, and the interpolation current $I_{O1}$ from the interpolation current generating circuit 520 becomes the current $I_{O2}$ inputted into the current-to-voltage converting unit 530b after mirrored by the current mirror unit 542, such that the current-to-voltage converting unit 530b generates the interpolation voltage $V_{gcN}$ according to the current $I_{O2}$.

Moreover, the current-to-voltage converting unit 530b similarly includes a voltage-drop unit (e.g. resistor R) and an operational amplifier 532b. The operational amplifier 532b has a positive input for receiving a negative-polarity reference voltage $V_{refNH}$ which can be preset to be the voltage Vr7 as shown in FIG. 4. The resistor R is coupled between a negative input and an output of the operational amplifier 532b. When the current $I_{O2}$ is generated, the interpolation voltage $V_{gcN}$ is correspondingly generated at the output of the operational amplifier 532b according to the current $I_{O2}$ flowing through the resistor R and equivalent to the interpolation current $I_{O1}$ (i.e. $V_{gcN}=V_{refNH}-I_{O2}*R$), in which the interpolation voltage $V_{gcN}$ is the negative-polarity interpolation voltage relative to the common voltage Vcom and also can be directly used as the negative-polarity gamma correction voltage relative to the common voltage Vcom without the S/H circuit 510.

Figure 7:
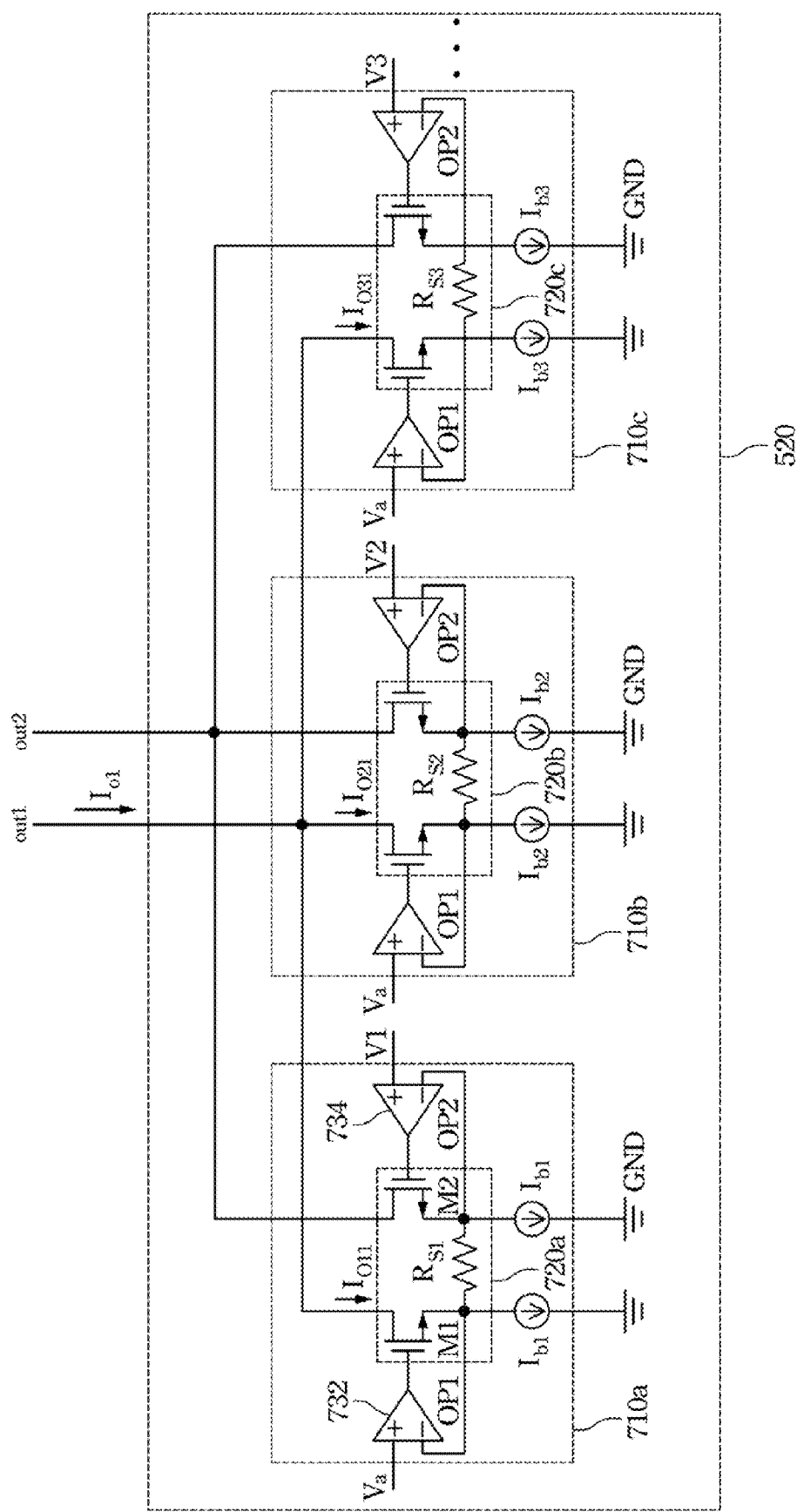
FIG. 7 illustrates the interpolation current generating circuit as shown in FIG. 5 or FIG. 6 according to one embodiment of the present invention.

FIG. 7 illustrates the interpolation current generating circuit as shown in FIG. 5 or FIG. 6 according to one embodiment of the present invention. The interpolation current generating circuit 520 includes a plurality of current interpolating units (i.e. current interpolating units 710a, 710b, 710c, . . . , etc.), in which the current interpolating units 710a, 710b, 710c, . . . , etc. are configured for receiving the operating voltage Va and corresponding reference voltages (i.e. reference voltages V1, V2, V3, . . . , etc.) to generate corresponding operating currents (i.e. operating currents $I_{O11}$, $I_{O21}$, $I_{O31}$, . . . , etc.). When the operating voltage Va changes, corresponding current interpolating units of the current interpolating units 710a, 710b, 710c, . . . , etc. generate corresponding operating currents of the operating currents $I_{O11}$, $I_{O21}$, $I_{O31}$, . . . , etc., and the operating currents $I_{O11}$, $I_{O21}$, $I_{O31}$, . . . , etc. generated based on the operating voltage Va are superimposed to be the interpolation current $I_{O1}$. For convenient description, only three current interpolating units 710a, 710b and 710c are used as an example as follows. However, several current interpolating units can be designed in the interpolation current generating circuit 520 in practice by persons skilled in the art.

As shown in FIG. 7, each of the current interpolating units 710a, 710b and 710c includes at least one tail current source, a differential pair circuit, a first operational amplifier and a second operational amplifier. The current interpolating units 710a includes two tail current sources $I_{b1}$, a differential pair circuit 720a, a first operational amplifier 732 and a second operational amplifier 734. The differential pair circuit 720a is coupled to the tail current sources $I_{b1}$ and has two differential inputs. The output of the first operational amplifier 732 is coupled to one of the differential inputs, the positive input of the first operational amplifier 732 is configured for receiving the operating voltage Va, and the negative input of the first operational amplifier 732 is coupled to the tail current source $I_{b1}$ and the differential pair circuit 720a. The output of the second operational amplifier 734 is coupled to the other of the differential inputs, the positive input of the second operational amplifier 734 is configured for receiving the reference voltage V1, and the negative input of the second operational amplifier 734 is coupled to the tail current source $I_{b1}$ and the differential pair circuit 720a. The architectures in the current interpolating units 710b and 710c are similar to that in the current interpolating unit 710a. Compared to the current interpolating unit 710a, the current interpolating unit 710b includes tail current sources $I_{b2}$ and receives the reference voltage V2, and the current interpolating unit 710c includes tail current sources $I_{b3}$ and receives the reference voltage V3. In the present embodiment, the tail current sources $I_{b1}$, $I_{b2}$ and $I_{b3}$ are different from one another, the reference voltages V1, V2 and V3 are also different from one another, and V1<V2<V3.

In addition, each of the differential pair circuits 720a, 720b and 720c respectively in the current interpolating units 710a, 710b and 710c can include two transistors and a resistor, and the differential pair circuits 720a, 720b and 720c are coupled in parallel with one another. For the differential pair circuit 720a in the current interpolating unit 710a, it can include transistors M1 and M2 and a resistor $R_{S1}$, in which the resistor $R_{S1}$ is coupled between sources of the transistors M1 and M2, gates of the transistors M1 and M2 are respectively coupled to the outputs of the first operational amplifier 732 and the second operational amplifier 734, the sources of the transistors M1 and M2 are respectively coupled to the negative inputs of the first operational amplifier 732 and the second operational amplifier 734 and the tail current sources $I_{b1}$, and drains of the transistors M1 and M2 are respectively coupled in parallel to drains of the transistors in the differential pair circuits 720b and 720c. As a result, the drain voltages the transistors M1 and M2 can separately change with the operating voltage Va and the reference voltage V1 according to the operations of the first operational amplifier 732 and the second operational amplifier 734.

The architectures in the differential pair circuits 720b and 720c are similar to that in the differential pair circuit 720a. Compared to the differential pair circuit 720a, the differential pair circuits 720b and 720c include a resistor $R_{S2}$ and a resistor $R_{S3}$ respectively, and the resistors $R_{S1}$, $R_{S2}$ and $R_{S3}$ are different in the present embodiment.

In operation, the current interpolating units 710a, 710b and 710c generate corresponding operating currents $I_{O11}$, $I_{O21}$ and $I_{O31}$ according to the relativity of the operating voltage Va to the corresponding reference voltages V1, V2 and V3. In other words, when the operating voltage Va increases, the current interpolating units 710a, 710b and 710c sequentially generate the operating currents $I_{O11}$, $I_{O21}$ and $I_{O31}$, respectively, and each of the operating currents $I_{O11}$, $I_{O21}$ and $I_{O31}$ has an approximately linear relation to the operating voltage Va.

Furthermore, under the situation that the reference voltages V1, V2 and V3 are all different, when the operating voltage Va increases to be larger than at least one of the reference voltages V1, V2 and V3, at least one of the corresponding current interpolating units 710a, 710b and 710c generates the operating current having a determined value. For example, when the operating voltage Va increases to a preset value larger or far larger than the reference voltage V1, the operating current $I_{O11}$ generated by the current interpolating unit 710a can have a determined value.

Specifically, under the situation of V1<V2<V3, when the operating voltage Va is far smaller than V1, the current interpolating units 710a, 710b and 710c generate no operating current. When the operating voltage Va increases with the change of the digital image data, the operating current $I_{O11}$ is correspondingly generated and has an approximately linear relation to the operating voltage Va. At the moment, if the operating voltage Va increases to be approximately equal to V1, the operating current $I_{O11}$ is approximately equal to $I_{b1}$. When the operating voltage Va continues increasing to a preset value far larger than V1 and far smaller than V2, the operating current $I_{O11}$ is approximately equal to $2I_{b1}$, and the operating current $I_{O11}$ has a determined value at the moment. The interpolation current $I_{O1}$ is approximately equal to the operating current $I_{O11}$ at the moment.

After that, when the operating voltage Va continues increasing with the change of the digital image data, the operating current $I_{O21}$ is correspondingly generated and has another approximately linear relation to the operating voltage Va. At the moment, if the operating voltage Va increases to be approximately equal to V2, the operating current $I_{O21}$ is approximately equal to $I_{b2}$. When the operating voltage Va continues increasing to another preset value far larger than V2 and far smaller than V3, the operating current $I_{O21}$ is approximately equal to $2I_{b2}$, and the operating current $I_{O21}$ has a determined value at the moment. The interpolation current $I_{O1}$ is approximately equal to the total value of the operating current $I_{O21}$ superimposed on the operating current $I_{O11}$ at the moment.

Similarly, when the operating voltage Va continues increasing, the operating current $I_{O31}$ is correspondingly generated and has yet another approximately linear relation to the operating voltage Va. At the moment, if the operating voltage Va increases to be approximately equal to V3, the operating current $I_{O31}$ is approximately equal to $I_{b3}$. When the operating voltage Va continues increasing to yet another preset value far larger than V3, the operating current $I_{O31}$ is approximately equal to $2I_{b3}$, and the operating current $I_{O31}$ has a determined value at the moment. The interpolation current $I_{O1}$ is approximately equal to the total value of the superimposition of the operating currents $I_{O11}$, $I_{O21}$ and $I_{O31}$ at the moment. As a result, the interpolation current $I_{O1}$ can be correspondingly generated according to different digital image data, and the generated interpolation current $I_{O1}$ can be thus converted into the corresponding voltage as the gamma correction voltage, as shown in FIG. 4, without using large areas of resistor strings any more to generate different dividing voltages, as shown in prior arts.

A method for convening digital data into analog data is also provided. The method includes the steps of: receiving an operating voltage corresponding to digital image data, comparing the operating voltage with a plurality of reference voltages respectively; generating one or more operating currents corresponding to the comparisons of the operating voltage and the reference voltages; superimposing the operating currents to be an interpolation current; and convening the interpolation current into an interpolation voltage.

For the foregoing embodiments, the interpolation DAC can be employed to not only reduce the size of circuit in the source driver, but also flexibly modify the required gamma correction voltages in practice such that the source driver can process digital image data with higher resolution.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An interpolation current generating circuit, comprising:
    a first current interpolating unit for receiving a first reference voltage and an operating voltage corresponding to digital image data to generate a first operating current; and
    a second current interpolating unit coupled in parallel to the first current interpolating unit and configured for receiving the operating voltage and a second reference voltage to generate a second operating current, the second reference voltage being larger than the first reference voltage;
    wherein when the operating voltage starts to increase, the first current interpolating unit generates the first operating current corresponding to the operating voltage to be an interpolation current, and when the operating voltage is larger than the first reference voltage and continues increasing to a preset value, the second current interpolating unit generates the second operating current corresponding to the operating voltage and the second operating current is superimposed on the first operating current to be the interpolation current.

2. The interpolation current generating circuit as claimed in claim 1, wherein the first current interpolating unit comprises:
    at least one first tail current source;
    a first differential pair unit coupled to the first tail current source and having two first differential inputs;
    a first operational amplifier having a first output coupled to one of the first differential inputs, a first positive input for receiving the operating voltage, and a first negative input coupled to the first tail current source and the first differential pair unit; and
    a second operational amplifier having a second output coupled to the other of the first differential inputs, a second positive input for receiving the first reference voltage, and a second negative input coupled to the first tail current source and the first differential pair unit.

3. The interpolation current generating circuit as claimed in claim 2, wherein the second current interpolating unit comprises:
    at least one second tail current source;
    a second differential pair unit coupled in parallel to the first differential pair unit and coupled to the second tail current source and having two second differential inputs;
    a third operational amplifier having a third output coupled to one of the second differential inputs, a third positive input for receiving the operating voltage, and a third negative input coupled to the second tail current source and the second differential pair unit; and
    a fourth operational amplifier having a fourth output coupled to the other of the second differential inputs, a fourth positive input for receiving the second reference voltage, and a fourth negative input coupled to the second tail current source and the second differential pair unit.

4. The interpolation current generating circuit as claimed in claim 3, wherein the first differential pair unit generates the first operating current according to relativity of the operating voltage to the first reference voltage.

5. The interpolation current generating circuit as claimed in claim 4, wherein the second differential pair unit generates the second operating current according to relativity of the operating voltage to the second reference voltage.

6. The interpolation current generating circuit as claimed in claim 1, wherein when the first current interpolating unit generates the first operating current, the first operating current has an approximately linear relation to the operating voltage.

7. The interpolation current generating circuit as claimed in claim 6, wherein when the second current interpolating unit generates the second operating current, the first operating current has a determined value and the second operating current has another linear relation to the operating voltage.

8. A non-linear interpolation circuit, comprising;
    a plurality of current interpolating units for receiving an operating voltage corresponding to digital image data and a plurality of corresponding reference voltages to generate a plurality of corresponding operating currents, wherein at least one of the current interpolating units generates at least one corresponding operating current of the operating currents when the operating voltage changes, and the operating currents generated based on the operating voltage are superimposed to be an interpolation current; and a current-to-voltage converting unit for converting the interpolation current into an interpolation voltage.

9. The non-linear interpolation circuit as claimed in claim 8, wherein the current interpolating units generate the corresponding operating currents according to relativity of the operating voltage to the corresponding reference voltages.

10. The non-linear interpolation circuit as claimed in claim 8, wherein the current interpolating units sequentially and respectively generate the operating currents having approximately linear relations to the operating voltage when the operating voltage increases.

11. The non-linear interpolation circuit as claimed in claim 8, wherein the reference voltages are different from one another, and one of the current interpolating units generates the operating current approximately having a determined value when the operating voltage increases to be larger than corresponding one of the reference voltages.

12. The non-linear interpolation circuit as claimed in claim 8, wherein each of the current interpolating unit comprises:
   at least one tail current source;
   a differential pair unit coupled to the tail current source and having two differential inputs;
   a first operational amplifier having a first output coupled to one of the differential inputs, a first positive input for receiving the operating voltage, and a first negative input coupled to the tail current source and the differential pair unit; and
   a second operational amplifier having a second output coupled to the other of the differential inputs, a second positive input for receiving one of the corresponding reference voltages, and a second negative input coupled to the tail current source and the differential pair unit.

13. The non-linear interpolation circuit as claimed in claim 8, wherein the current-to-voltage converting unit is configured for converting the interpolation current into a positive-polarity interpolation voltage relative to a common voltage.

14. The non-linear interpolation circuit as claimed in claim 13, wherein the current-to-voltage converting unit further comprises:
   a voltage-drop unit; and
   an operational amplifier, a positive input of the operational amplifier being configured for receiving a positive-polarity reference voltage, the voltage-drop unit being coupled between a negative input of the operational amplifier and an output of the operational amplifier;
   wherein the positive-polarity interpolation voltage is generated at the output of the operational amplifier according to the interpolation current flowing through the voltage-drop unit.

15. The non-linear interpolation circuit as claimed in claim 8, wherein the current-to-voltage converting unit is configured for converting the interpolation current into a negative-polarity interpolation voltage relative to a common voltage.

16. The non-linear interpolation circuit as claimed in claim 15, wherein the current-to-voltage converting unit further comprises:
   a voltage-drop unit; and
   an operational amplifier, a positive input of the operational amplifier being configured for receiving a negative-polarity reference voltage, the voltage-drop unit being coupled between a negative input of the operational amplifier and an output of the operational amplifier;
   wherein the positive-polarity interpolation voltage is generated at the output of the operational amplifier according to the interpolation current flowing through the voltage-drop unit.

17. A method for converting digital data into analog data, comprising:
   receiving an operating voltage corresponding to digital image data;
   comparing the operating voltage with a plurality of reference voltages respectively;
   generating one or more operating currents corresponding to the comparisons of the operating voltage and the reference voltages;
   superimposing the operating currents to be an interpolation current; and
   converting the interpolation current into an interpolation voltage.

18. The method as claimed in claim 17, wherein the operating currents have linear relations to the operating voltage when the operating voltage increases.

19. The method as claimed in claim 17, wherein the reference voltages are different from one another, and one of the operating currents has a determined value when the operating voltage increases to be larger than corresponding one of the reference voltages.

20. The method as claimed in claim 17, wherein the interpolation voltage is a positive-polarity interpolation voltage or a negative-polarity interpolation voltage relative to a common voltage.

* * * * *